Figure 1:
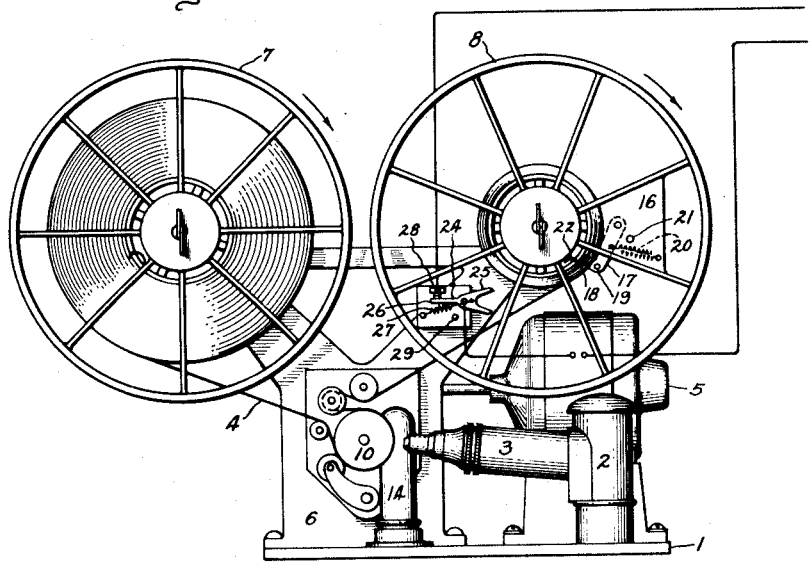

Oct. 20, 1931.　　　E. W. KELLOGG　　　1,828,569

FILM STOPPING APPARATUS

Filed June 30, 1930

Inventor:
Edward W. Kellogg,
by Charles E. Tullar
His Attorney.

Patented Oct. 20, 1931

1,828,569

UNITED STATES PATENT OFFICE

EDWARD W. KELLOGG, OF MOORESTOWN, NEW JERSEY, ASSIGNOR TO GENERAL ELECTRIC COMPANY, A CORPORATION OF NEW YORK

FILM STOPPING APPARATUS

Application filed June 30, 1930. Serial No. 464,865.

My invention relates to apparatus for reproducing sound from a film or ribbon type of record and particularly to apparatus in which it is desirable to stop the film driving machine before the record film is completely unwound and disengaged from the reel on which it has been wound. This is the situation, for example, when in normal operation the film is rewound onto the original reel without removal from the machine, the purpose of rewinding being to leave the film ready for immediate use, namely with the beginning part of the record on the outside.

Another example of sound reproducing apparatus to which my invention is especially applicable is one in which the film carries two or more sound records or tracks, recorded in alternately opposite directions, the reproducing apparatus being designed to move the film past the reproducing light first in one direction and then in the other, the optical and photo-sensitive apparatus being moved transversely to the film from one record track to the next at the time of reversal. In order that it shall be unnecessary to rethread the film in the machine at the time of reversal, the movement of the film must be stopped while there are still one or two turns of film on the reel which is being wound.

In order automatically to stop the machine when this point is reached, it has been the practice in the past to use perforations or notches in the film with rollers or contacts which operate when the notch or perforation passes, or to incorporate metal inserts in the film near the end, which by electrical, magnetic or mechanical means, cause a stopping device to operate. The use of all of these expedients is objectionable, since their operation depends upon the presence of some contacting device which is likely to cause abrasion of the film and is itself subject to wear, and which may be operated by an accidental tear in the film. My invention is free from these objections, and does not require that anything be done to the film by way of preparation. I have illustrated my invention as applied to apparatus for reproducing sound from a multi-track record. The sound record on the film is in a plurality of parallel tracks, reproduction being made from one track only each time the film passes through the apparatus. In passing through the apparatus, the film is unwound from one reel and wound up on another reel and after each passage in one direction the driving mechanism is reversed so as to cause the film to move in the opposite direction and rewind on the reel from which previously it was being unwound, reproduction of sound from one of the tracks or recordings taking place during each forward or reverse movement of the film, and the reversals being continued as many times as there are sound tracks on the film. It is the object of my invention to provide in apparatus of this character improved means for causing the film driving mechanism to stop at the proper time and without the end of film becoming detached from the reel from which it is being unwound at that time.

My invention will be better understood from the following description taken in connection with the accompanying drawings, and its scope will be pointed out in the appended claims.

Figure 2:
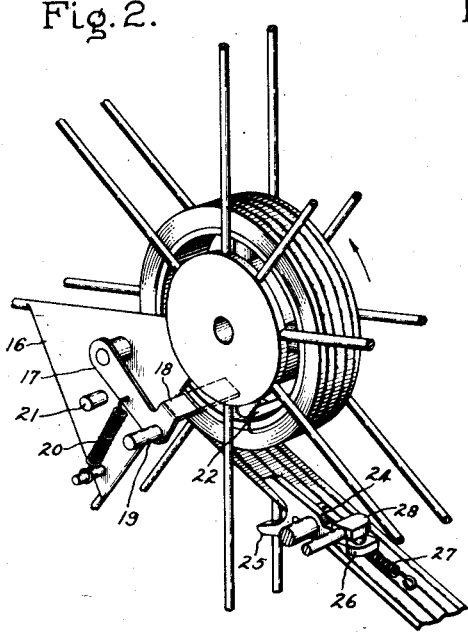
Figure 3:
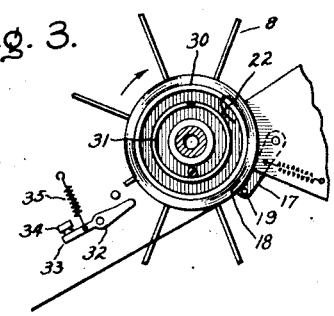
Figure 4:
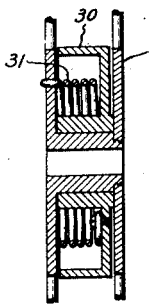

Referring to the drawings, Fig. 1 represents one form of apparatus embodying my invention; Fig. 2 is a detail thereof drawn to a larger scale; Figs. 3 and 4 show details of a modification.

The structure which I have illustrated comprises the base plate 1 upon which is mounted the light source 2 and the optical system 3 by which a narrow light beam is projected on the sound record carried by the film 4. The base also is shown supporting the driving motor 5 and the frame 6 which supports the film supporting and driving apparatus as well as the reels 7 and 8. The film supporting and driving apparatus comprises essentially the drum 10 which by suitable reduction gearing, not shown, is connected to be driven from the motor 5. The film in passing to and from the roller or drum 10 is shown engaged by other rollers which serve to increase the angle of wrap about the drum and may also serve other purposes which form no part of my present invention. The drum 10 may be of any suitable construction by which the light beam may be projected through the film either directly into a photoelectric cell or reflected to one side into the cell. I have indicated the latter construction by showing the photo-electric cell 14 mounted upon the base 1 into which the light beam after traversing the sound record is reflected by suitable means, such for example as a small mirror or prism arranged within the drum. For this purpose the drum preferably is divided transversely so as to provide an unobstructed opening beneath the sound track from which reproduction is being made, and the end of the drum next the photoelectric cell is made of glass or other transparent material. Inasmuch as this part of the apparatus constitutes no part of my present invention and for the purpose of rendering the drawing less confusing by the illustration of such details, I have omitted any showing of the details of the drum construction and of the means by which the light is reflected into the photo-electric cell.

My invention is concerned with the mechanism by which the movement of the film is stopped at the proper time to prevent complete unwinding of the film from the take-off reel and will now be described.

The reel 8 is shown having a web portion 16 between two adjacent spokes upon which is pivoted the arm 17. This arm has the lateral extension 18 which extends parallel with the axis of the reel and is preferably made thin whereby the film may be wound thereover without taking up any more room than is necessary. Attached to the arm 17 and extending in the opposite direction is the pin 19. The arm is biased in one direction by the spring 20 being thereby yieldingly held against the stop 21 when no film is in the reel. When the film is attached to the reel 8, the end is tucked into a slit in the hub portion of the reel in the usual manner, the end of the film being shown on the drawing at 22. For better anchoring of the film, one or two turns are wound on the drum, these anchoring turns being slipped under the extension 18, which does not extend quite across the drum, and therefore permits slipping the film past its end and underneath. The next turn of film which passes over the extension 18 depresses the lever 17 toward the center of the reel. The lever 17 is thereafter held in this position by the film, during the entire time that the record is being wound on and unwound from the reel 8. Only when the unwinding reaches the last turn over extension 18, does the lever 17 move outward again.

On the frame 6 there is mounted the lever 24 having a fork 25 at one end and a contact 26 at the opposite end. Spring 27 is connected with the lever in such a manner that the line of force exerted thereby may pass at either side of the pivotal center of the lever thereby resiliently retaining the lever in either one of two positions, the lever movement being limited in one direction by engagement of the contact 26 with a fixed contact 28, and being limited in the opposite direction by engagement with the stop 29. The lever 24 is so located with respect to the lever 17 carried by the reel that as long as lever 17 is held down by the film over-lying the extension 18, the pin 19 will not hit the fork 25 during rotation. However, as soon as the extension 17 is released by the unwinding of the last turn thereover, lever 17 is moved outwardly by the spring 20 until stopped by the pin 21. With the lever 17 in this position, the pin 19 engages one side of the fork 25 and throws lever 24 to the opposite or open circuit position. The circuit controlled by contacts 26 and 28 then operates to stop the driving apparatus. For the sake of simplicity, I have shown this circuit as merely a series connection with the driving motor 5, it being assumed that as soon as the motor circuit is thus opened the mechanism will come to rest before the reel 8 has been rotated one more revolution, for at the end of about one more revolution the extension 18 will interfere with further unwinding of the film. Obviously, various well known means may be employed to apply a brake to the motor when the energizing circuit is opened should such be found necessary.

After the apparatus has been thus stopped automatically, the operator by suitable means not shown, may cause the motor to be operated in the opposite direction, thus rewinding the film from reel 7 back on to reel 8. The initial movement of reel 8 will cause the pin 19 on lever 17 by engagement with the fork 25 to throw the contact lever 24 to its original position as illustrated in Fig. 1.

It will be understood that reel 7 and the frame 6 may also be equipped with apparatus similar to that described above by which the machine is stopped automatically when the film is almost completely wound off of reel 7 back on to reel 8, but for the sake of simplicity I have omitted the showing of such apparatus in connection with reel 7. It will be understood that suitable means are provided for shifting the light beam transversely to the film for reproducing sound from another track. Inasmuch as the shifting means forms no part of my invention, I have not illustrated the same.

While for the sake of simplicity I have shown my invention as applied to the purpose of stopping the motor, assuming that the person operating the machine will start it in the reverse direction, it is obvious that my invention is equally applicable to the purpose of automatically effecting a complete reversal or to controlling auxiliary devices such as a mechanism for shifting the optical system to a position opposite a different sound record track. For such purposes one of the simplest expedients would be to use the contacts 26, not to control the motor circuit directly, but to operate electrical relays which by well known arrangements can be made to operate a brake, reverse the motor, and operate auxiliary devices. It is also obvious that a reversing switch might be employed mechanically operated alternately by the lever 24 and by the corresponding lever for the other reel.

Under certain circumstances it may be desirable to allow the reel to make one or more complete turns after the circuit controlling lever 24 has been released by lever 17. It may, for example, be undesirable to stop the machine within less than one revolution of the reel 8. I have therefore provided the modified arrangement shown in Figs. 3 and 4 which will permit such rotation of the reel for several revolutions after the operation of the stopping mechanism, without withdrawing the end of the film from the slit in the hub portion of the reel. According to this modification the reel 8 has a separate hub portion 30 which is rotatable relative to the body or flange portion of the reel and is connected thereto by means of the coil spring 31. The contact lever which is carried by the frame as in the previous case, is shown at 32 having the contact 33 at one end adapted to engage the fixed contact 34 and being biased by the spring 35. According to this construction the film when originally wound on the reel 8 is given several turns before it is allowed to overlap the extension 18 on lever 17. This may be accomplished by slipping the film under the end of extension 18, as the initial turns are being wound upon the hub, the extension 18 being of such length that it does not reach the opposite flange, thereby leaving an opening sufficient to insert the film. Another method is to rotate the hub 30 several revolutions by hand, against the tension of spring 31, before inserting the film in the anchoring slit. Upon releasing the hub 30, the spring 31 will cause it to rotate and wind the desired number of turns onto the hub under the lever extension 18. In the unwinding operation when the last turn over the lever extension 18 is unwound, the lever 7 is moved outwardly and the pin 19 carried thereby engages the contact lever 32 moving it against stop 36 and opening the circuit at contacts 33 and 34. The body of reel 8 is thereby brought to rest but the hub portion is free to rotate for one or more revolutions during which the coil spring 31 is wound up. At the beginning of the rewinding operation, spring 31 will naturally restore itself to its original condition and wind up the film one or more turns on the hub portion 30.

What I claim as new and desire to secure by Letters Patent of the United States is:

1. In reproducing apparatus employing a record film, a reel having a flange portion and a relatively rotatable hub portion upon which the film is adapted to be wound, and means responsive to a predetermined unwinding of the film for causing the cessation of further movement of the flange portion of the reel.

2. In reproducing apparatus employing a record film, a reel having a flange portion and a relatively rotatable hub portion upon which the film is adapted to be wound, and means responsive to a predetermined unwinding of the film for arresting further movement of the flange portion of the reel and for causing the stopping of the apparatus.

3. In reproducing apparatus employing a record film, a reel having a flange portion and a relatively rotatable hub portion upon which a film is adapted to be wound, a member carried by the reel and having a portion arranged to be included between two adjacent convolutions of the film, means for moving the member outwardly when said portion is released by the unwinding of the film, and a device for controlling the stopping of the apparatus, said member being arranged to engage said device when released by the film and to stop the flange portion of said reel against further rotation.

4. In reproducing apparatus employing a record film, a reel having a flange portion and a relatively rotatable hub portion upon which the film is adapted to be wound, a yielding connection between said portions, and means responsive to a predetermined unwinding of the film for arresting further movement of the flange portion of the reel and for causing the stopping of the apparatus.

In witness whereof, I have hereunto set my hand this 27th day of June, 1930.

EDWARD W. KELLOGG.